Figure 1:
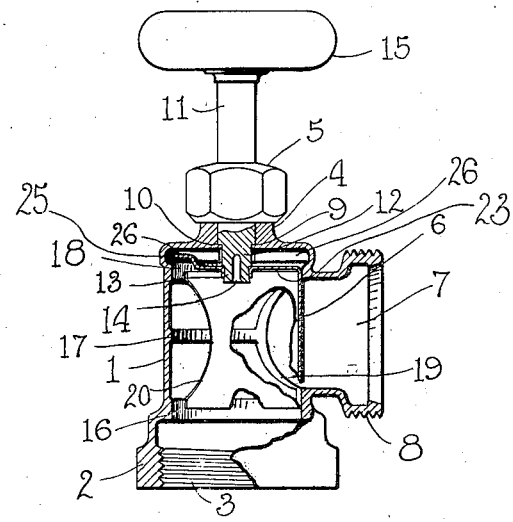

W. E. ARNDT.
VALVE.
APPLICATION FILED APR. 20, 1914.

1,138,613.

Patented May 11, 1915.

Witnesses
Arthur F. Draper
G. E. McGrann

Inventor
William E. Arndt

By Bethel & Bethel
Attorneys

UNITED STATES PATENT OFFICE.

WILLIAM E. ARNDT, OF DETROIT, MICHIGAN, ASSIGNOR TO CAPITAL BRASS WORKS, OF DETROIT, MICHIGAN, A CORPORATION OF MICHIGAN.

VALVE.

1,138,613. Specification of Letters Patent. Patented May 11, 1915.

Application filed April 20, 1914. Serial No. 833,010.

*To all whom it may concern:*

Be it known that I, WILLIAM E. ARNDT, a citizen of the United States of America, residing at Detroit, in the county of Wayne and State of Michigan, have invented certain new and useful Improvements in Valves, of which the following is a specification, reference being had therein to the accompanying drawings.

This invention relates to valves, and more particularly to a one-way or angle valve having a sleeve valvular member that controls the passage through the valve.

The object of my invention is to provide a valve of the above type consisting of comparatively few parts that are easy to assemble, durable, inexpensive to manufacture, and highly efficient for the purposes for which they are intended.

The valve consists, essentially, of a body, a stem and a valvular member connected to the stem to rotate therewith for controlling the passage through the body. These parts are of simple design, particularly the valvular member which has a novel connection with the valve stem that prevents accidental displacement of the valvular member and insures positive action and rapidity in assembling the parts of the valve.

With the above and other objects in view, the invention resides in the novel construction and arrangement of parts to be hereinafter specifically described and then claimed, and reference will now be had to the drawing, wherein—

Figure 2:
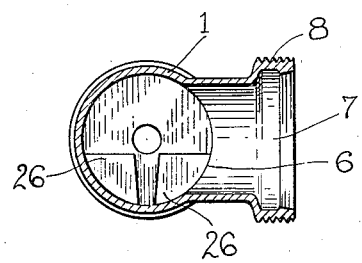
Figure 3:
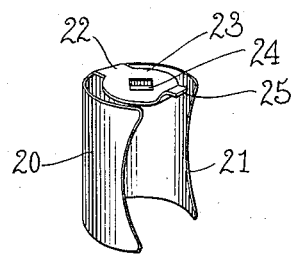

Figure 1 is a side elevation of a valve partly broken away and partly in section; Fig. 2 is a horizontal sectional view of the valve illustrating stops forming part of the valve body, and Fig. 3 is a perspective view of a detached valvular member.

A valve in accordance with my invention comprises a cylindrical or tubular body 1 having an enlarged open end 2 with the inner walls thereof screw threaded, as at 3, whereby the valve body can be connected to a pipe or other structure (not shown). The opposite end of the valve body 1 is closed and provided with a stuffing box 4 having a detachable gland or cap 5. The side of the valve body 1 has an opening 6 in communication with a side connection or nipple 7, said side connection or nipple having exterior threads 8.

The stuffing box 4 is formed with an annular shoulder 9 and engaging said shoulder is the annular shoulder 10 of a valve stem 11 that extends through the stuffing box into the valve body 1. The shoulder 10 is formed by reducing the inner end of the valve stem 11 to provide a shank 12 and said shank is further reduced to form a tang or rectangular nipple 13. This reduced inner end of the stem has a longitudinal bore 14, the purpose of which will presently appear, and the outer end of the stem 11 has a conventional form of hand wheel 15 which facilitates rotating the stem 11.

The inner walls of the valve body 1 are formed with ground or machined bearing surfaces 16, 17, 18 and 19. The bearing surfaces 16 and 18 are at the ends of the valve body with the bearing surface 17 intermediate the bearing surfaces 18 and 16, and the bearing surface 19 surrounds the opening 6 in the side of the body. These surfaces afford bearings and non-leakable connections between the valve body and a valvular member 20 rotatably mounted within the valve body. The valvular member 20 is in the form of a sleeve that has one side thereof cut away, as at 21, to establish communication between the opening 6 and the interior of the sleeve and thereby form an angular passage through the valve body. One end of the member 20 has an integral lug 22 supporting a flat circular head 23 within the circumference of the member and at right angles to the longitudinal axis thereof. The head 23 is concentric of the member 20 and has a central flanged rectangular opening 24 to receive the tang or nipple 13 of the valve stem. The flanges of the opening 24 snugly embrace the tang 13 and firmly retain the valvular member 20 in engagement with the valve stem to rotate in unison therewith. There are various ways of securing the valvular member to the valve stem, for instance, by brazing, upsetting the flanges of the head 23 and by resorting to solder, but as a matter of good construction and rapidity in assembling these two elements, it is preferable to insert a suitable instrument in the bore 14 of the stem 11 and spread, flare or up-set the reduced end of the stem sufficiently to positively anchor the valvular member upon the valve stem. The head 23 of the valvular member 20 has an off-set lip 25 adapted to engage stops 26 formed integral with the closed end of the valve body, said stops limiting the rotative movement of the valvular member, whereby the valve will be either open or closed. The valvular member 20 has the action of a shutter in closing the opening 6 of the valve body and with the valvular member in an open position there is an unobstructed passage through said valve body. When the valve is used in a vertical position, the shoulders 9 and 10 prevent the valvular member 20 from falling into a pipe line, should the hand wheel 15 thereof be removed, besides the shoulders correctly position the valvular member 20 relatively to the opening 6 and the bearing surfaces of the valve body.

I attach considerable importance to the simplicity of construction resorted to in connection with the valvular member, as this member can be cut and stamped from sheet metal and then bent and shaped to properly fit in and serve its purpose of controlling the passage through the valve body. When made of brass or other durable material the valve is practically indestructible under ordinary conditions, and while in the drawing there is illustrated a preferred embodiment of the invention, it is to be understood that the structural elements are susceptible to such variations and modifications as fall within the scope of the appended claims.

What I claim is:

1. A valve of the type described comprising a cylindrical body having an open end and a side connection, a valve stem rotatably supported by an end of said body, and a sheet metal valvular member within said body and having an inturned head at one end thereof free of said valve body, said head having an opening to receive said stem.

2. A valve of the type described comprising a body having one end thereof open and the opposite end closed and the side thereof provided with a connection, a rotatable valve stem supported in the closed end of said body, a sheet metal valvular member rotatably mounted in said body and having the form of a sleeve with one side thereof cut away to establish communication between the open end of said body and the side connection thereof, and means carried by one side of said valvular member at an end thereof and disposed concentrically thereof for permanently connecting said member to said stem in axial alinement therewith.

3. A sheet metal valvular member for valves comprising a sleeve having the action of a shutter, said sleeve having one side thereof completely cut away, and a head carried by the end of said sleeve at one side thereof and provided with means adapted to limit the movement of said sleeve within a valve.

4. A valve of the type described comprising a cylindrical body having an open end, a closed end and a side connection, a rotatable valve stem permanently supported by the closed end of said valve body and having the inner end thereof reduced, a sheet metal sleeve rotatably mounted in said valve body and having the side thereof completely cut away to establish communication between the side connection of said body and the open end thereof, a head carried by an end of said sleeve and disposed at right angles to the longitudinal axis thereof and fitted upon the inner end of said stem and held thereon by flaring the end of said stem, and means in connection with said head and said valve body for limiting the movement of said sleeve within said body.

5. In a valve, the combination with a cylindrical body having one end thereof closed and the opposite end thereof open, a side connection carried by said valve body, and a valve stem rotatably supported in the closed end of said body and having the inner end thereof reduced, of a sheet metal sleeve having the action of a shutter within said valve body and having a side thereof completely cut away and adapted to establish communication between said side connection and the open end of said body, a head formed integral with the side of said sleeve and disposed at a right angle, said head having a flanged rectangular opening formed therein to receive the reduced end of said stem, said stem having the end thereof flared to retain said head in engagement therewith.

6. In a valve, the combination with a cylindrical body having one end thereof closed and the opposite end thereof open, a side connection carried by said body and a valve stem rotatably supported in the closed end of said body and having the inner end thereof reduced, of a sheet metal sleeve having the action of a shutter within said valve body and having the sides thereof completely cut away and adapted to establish communication between said side connection and the open end of said body, a head integral with said sleeve and disposed at a right angle, said head having a flanged rectangular opening therein to receive the reduced end of said sleeve, said stem having the end thereof flared to retain said head in engagement therewith, and means in connection with said head adapted to limit the movement of said sleeve within said valve body.

7. In a valve, a valve body, a stem rotatably seated in the closed end thereof, and a sheet metal member having the longitudinal axis thereof in alinement with said stem, said member having the action of a shutter within said body and connected to said stem by flaring the end thereof.

8. The combination with a valve body and a valve stem, of a tubular shutter in said body and having a side thereof cut away, a lug at one end of said shutter, a head carried thereby and permanently connected to said stem, and a lip carried by said head opposite said stem and adapted to coöperate with said body to limit the movement of said shutter therein.

In testimony whereof I affix my signature in presence of two witnesses.

WILLIAM E. ARNDT.

Witnesses:
ANNA M. DORR,
G. E. MCGRANN.